Feb. 19, 1952     G. J. NICHOLS     2,586,076
ELECTRIC MOTOR APPARATUS FOR AUTOMATICALLY REGULATING
THE SPEED OF STRIP REELING DEVICES
Filed Dec. 17, 1949
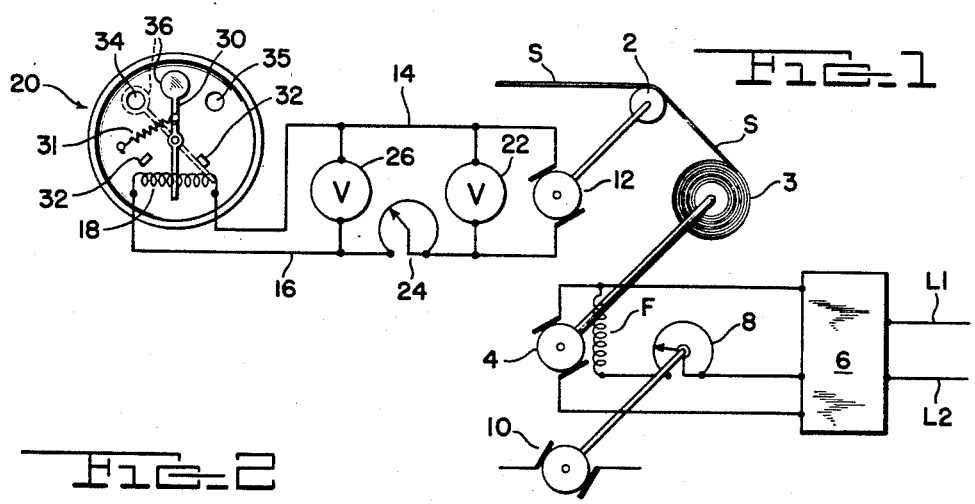
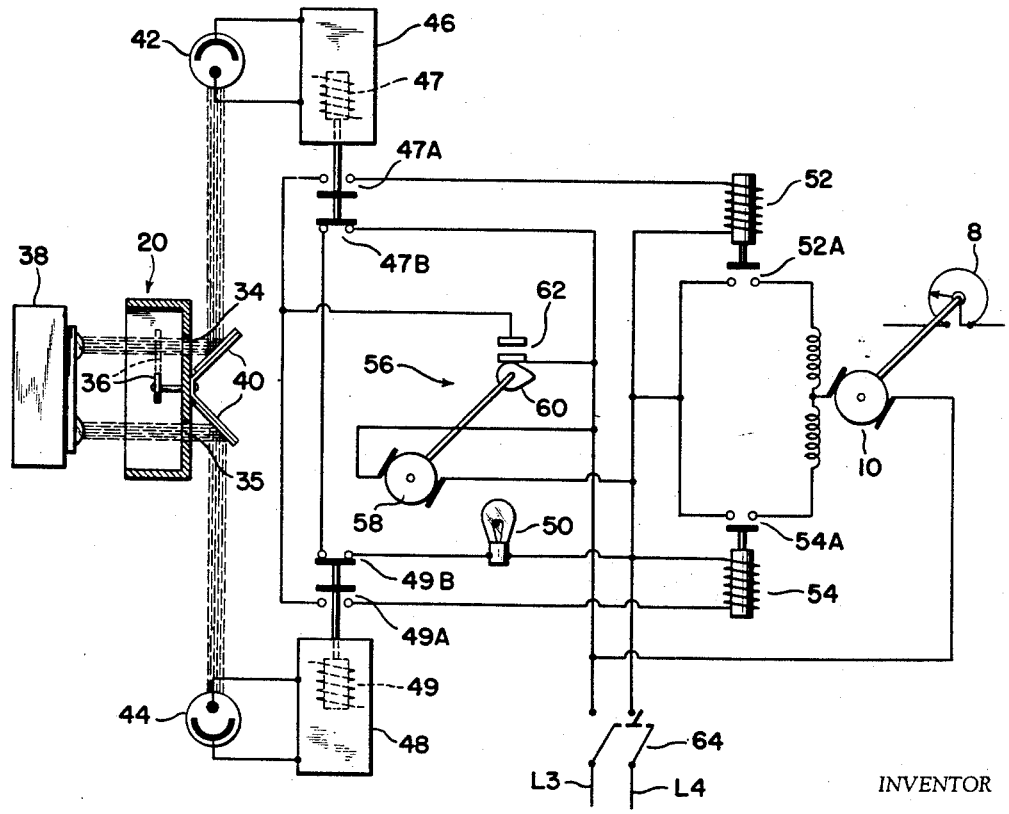
INVENTOR
GEORGE J. NICHOLS
BY Donald G. Dalton
ATTORNEY Patented Feb. 19, 1952

2,586,076

UNITED STATES PATENT OFFICE 2,586,076

ELECTRIC MOTOR APPARATUS FOR AUTOMATICALLY REGULATING THE SPEED OF STRIP REELING DEVICES

George J. Nichols, Gary, Ind.

Application December 17, 1949, Serial No. 133,622

4 Claims. (Cl. 318—6)

My invention relates to electrical control apparatus for maintaining the lineal speed of travel of continuous strip material constant at a preselected value, and particularly to electrical control apparatus for automatically regulating the speed of coil reeling devices.

In continuous strip operation, it is common practice to pull the strip material through one or more pieces of processing equipment arranged in sequence by means of a coiler or reeling device located at the end of the treating line. In such a practice the diameter of the coil increases as the reeling continues, causing a gradual increase in the line speed of travel of the strip material through the processing equipment. In many such instances the uniformity and effectiveness of the processing is adversely effected by this speed change. It has been the practice heretofore for the operator to manually regulate the speed of the coiler so as to maintain the lineal speed of travel of the strip substantially constant at a desired value. This requires the constant attention of the operator and the results are not always satisfactory.

Accordingly it is an object of the present invention to supply an electrical control system which will automatically adjust the speed of the reeling device so that a substantially constant lineal speed of strip is maintained.

Another object being to provide such a control system in which the value of lineal operating speed to be maintained can be varied as desired.

These and other objects will become apparent from the following specification when read in conjunction with the attached drawings wherein:

Figure 1 is a schematic arrangement of a strip reeling device and shows the speed metering circuit of the control systems of my invention; and Figure 2 is a wiring diagram showing other electrical circuits of the control system.

With particular reference to the drawings, Figure 1 shows strip S passing over a conveyor roll 2 and being wound on a reeling device 3. The latter is driven by a motor 4 powered from a suitable D. C. source $L_1$ and $L_2$ through a conventional manually operated starter and speed control box 6. Connected in circuit between the motor field F and the starter box 6 is a rheostat 8 driven by a reversing motor 10 which is powered from a suitable source $L_3$ and $L_4$ as indicated in Figure 2. Mechanically driven by conveyor roll 2 is a tachometer-generator 12 which is connected by wires 14 and 16 to operating coil 18 of a specially constructed meter 20. A bolt-meter 22 having a scale calibrated in feet-per-minute is connected across the tachometer-generator and a variable rheostat 24 is connected into the circuit on the far side of meter 22 so that the voltage applied to the meter 20 may be adjusted without influencing the reading of meter 22. Volt-meter 26 is connected into the circuit to indicate the voltage applied to meter 20.

In addition to the operating coil 18, the meter 20 comprises a pivotally mounted indicating arm 30 having a tension spring 31 which returns the arm to a minimum position when the voltage applied to coil 18 falls below a value "X." As voltage in excess of this minimum is applied to the coil, the arm 30 is deflected toward the right and will reach a maximum position at a second voltage "Y." Stops 32 are provided which prevent the indicating arm from traveling beyond the maximum and minimum positions. The case of meter 20 is provided with two light transmitting passageways 34 and 35, the former being located at the minimum and the latter at the maximum position of travel of arm 30. A target or shutter 36 adapted to close either of the passageways to the transmission of light is carried by the arm 30.

Referring now to Figure 2 a light source 38 is provided which directs a beam of light through the openings 34 and 35 of meter 20 to angularly placed mirrors 40 one of which reflects the beam from openings 34 to a photo-cell 42, the other the beam from opening 35 to a photo-cell 44. The cell 42 is connected to and operates a phototroller unit 46. The cell 44 is connected to and operates a similar unit 48. The latter equipment is well known and the internal wiring of the same has not been indicated in the drawing, it being sufficient for present purposes to say that the units 46 and 48 are powered from a suitable source, connections not shown, and contain relays 47 and 49 respectively which are operated in response to deenergization of the photo-cell associated therewith. The relays 47 and 49 must have normally open contacts 47A and 49A respectively and preferably have normally closed contacts 47B and 49B respectively. The normally closed contacts 47B and 49B are connected in series to an indicator lamp 50 across the power source $L_3$ and $L_4$. One side of the normally open contact 47A is connected through the operating coil of a normally open relay 52 to the line $L_4$. Similarly one side of the normally open contact 49A is connected through the operating coil of a normally open relay 54 to the line $L_4$. The opposite sides of these contacts are commoned and the circuit completed to the line L₃ preferably through a circuit interrupter indicated in general by the reference numeral 56. The latter may comprise a telechron motor 58 which drives a suitably shaped cam 60 for moving the movable element of a pair of contacts 62 into momentary contact with the fixed element thereof. The circuit interrupter 56 is used so that the motor 10 will move the rheostat in steps, thus minimizing over-correction of strip speed. The mechanical gearing of this arrangement is preferably such that contact is made once every fifteen seconds. The relays 52 and 54 have normally open contacts 52A and 54A, respectively, connected in shunt relationship with the reversing motor 10 whereby the operation and direction of rotation of the motor is controlled. Disconnect switch 64 is provided in the power lines L₃ and L₄ for rendering the control equipment inoperative.

The voltages "X" and "Y" mentioned in the description of meter 20 are fixed in the design of the meter 20 to be in accord with the output characteristics of the tachometer-generator 12 and the range of operating speeds to be controlled; e. g., if the strip speed must be controlled at any value between 10 and 100 F. P. M. and if the output of the tachometer-generator to be used is 1 volt and 10 volts at these speeds respectively, the voltage "X" might be fixed at 0.95 volt and the voltage "Y" at 1.05 volt. Under these conditions the rheostat 24 would be picked to have a resistance sufficient to limit the voltage applied to the meter 20 to 1 volt when the selected operating speed is at the maximum controllable value, in this instance 100 F. P. M., and the control circuits would operate in the following manner. If it is desired to maintain an operating speed of 10 F. P. M., the operator would set the reeling device in motion and adjust the reel motor speed by means of the controller 6 until the speed indicating volt-meter 22 reads 10 F. P. M. He would then adjust rheostat 24 so that the voltage indicated by meter 26 was approximately 1 volt, under which conditions the arm 30 of meter 20 would assume a neutral position between the light transmitting passageways 34 and 35. The control circuit would be rendered operative by closing switch 64. As the coil diameter builds up on the reeling device, the speed of the strip S over roll 2 increases. This is immediately reflected as an increase in the voltage output of the tachometer-generator which causes the arm 30 of meter 20 to move toward the right until the shutter 36 closes passageway 35 to the passage of light deenergizing photocell 44. This causes relay 49 to be operated by photo-troller 48, opening contacts 49B in the circuit to the indicating light 50 and simultaneously closing contacts 49A in the circuit to the operating coil of normally open relay 54. The operating contacts 54A will then close when the cam 60 of the circuit interrupter 56 rotates to close the contacts 62. This action completes the power circuit of the reversing motor 10 which moves the rheostat 8 to strengthen the fields of reel drive motor 4, decreasing the speed of the latter. The action is repeated each time the cam 60 closes the contacts 62 until the speed of the strip is restored to 10 F. P. M. at which time the arm 30 will move to neutral position uncovering the light transmitting passageway 35 and re-energizing cell 44, whereupon the photo-troller unit will deenergize relay 49. If, for any reason, the speed should decrease below 10 F. P. M., the arm 30 would be deflected to the left to close opening 34, thus deenergizing photo-cell 42 causing photo-troller unit 46 to operate relay 47 whereupon normally open relay 52 could be energized by the current interrupter 56 at fifteen second intervals intermittently closing its contacts 52A and causing the motor 10 to rotate to the reverse direction to weaken the fields of drive motor 4 and increase the speed of the reel.

If it is desired to maintain a higher speed, the operator adjusts controller 6 until the desired speed reads on the meter 22 and adjusts the rheostat 24 until meter 26 reads 1 volt. Then upon closing switch 64 the control will operate as previously described to automatically maintain the strip speed constant at the selected value.

The indicating lamp 50 is provided merely to signal the operator that the control circuit is working. During normal operations the lamp will flash on and off, being lit when the system is in balance and being extinguished when it is operating to effect speed changes to restore balance.

While I have shown and described a specific embodiment of my invention I do not wish to be limited exactly thereto, but only by the scope of the appended claims.

I claim:

1. In strip handling equipment wherein a strip of material is wound on a reeling device, a control system for maintaining the lineal speed of travel of said strip constant comprising in combination a motor for driving the reeling device, a rheostat in circuit with said drive motor for controlling the speed thereof, a reversing motor for driving said rheostat, a first normally open relay in circuit with said reversing motor to operate the motor in one direction, a second normally open relay in circuit with said reversing motor to operate the motor in the opposite direction, a tachometer generator driven by the strip, meter-like means connected across said generator, said last mentioned means including a pivotally mounted arm, means responsive to variations in the voltage output of said generator for moving said arm between a minimum position and a maximum position, two spaced apart light transmitting passageways, one located at the minimum position and the other at the maximum position of arm movement, and an opaque shutter mounted on said arm for selectively closing the respective passageway to the transmission of light when the arm is in its maximum or minimum position, a light source adapted to direct light through said passageways, a pair of photo cells one energized by each of the light beams transmitted through said passageways, and means responsive to the deenergization of said photo cells to selectively close one of the aforementioned normally open relays in circuit with the reversing motor.

2. In strip handling equipment wherein a strip of material is wound on a reeling device, a control system for maintaining the lineal speed of travel of said strip constant according to claim 1 in which the means responsive to the deenergization of the photo cells includes a circuit interrupter for causing the action of the said last named means as respects the closing of the normally open relays in circuit with the reversing motor to be intermittent.

3. In strip handling equipment wherein a strip of material is wound on a reeling device, control apparatus for maintaining the lineal speed of travel of said strip constant comprising in combination a motor for driving the reeling device, a rheostat in circuit with said drive motor for controlling the speed thereof, a reversing motor for driving said rheostat, a first normally open relay in circuit with said reversing motor to operate the motor in one direction, a second normal open relay in circuit with said reversing motor to operate the motor in the opposite direction, a tachometer generator driven by said strip, meter-like means connected across said generator and responsive to variations in the voltage output thereof, said last mentioned means including a pivotally mounted arm, means adapted to move the arm to a minimum position at a first specific voltage and to deflect the arm to a maximum position by a second specific voltage greater than the first, two spaced apart light transmitting passageways therethrough, one located at said minimum position and the other at said maximum position of arm movement, and an opaque shutter mounted on the arm for selectively closing the respective passageway to the transmission of light when the arm is in its maximum or minimum position, variable means in circuit with the tachometer generator for limiting the voltage which can be applied by the generator to the meter-like means to substantially the aforementioned second specific voltage, a light source adapted to direct light through the passageways of the meter-like means, a pair of photo cells one energized by each of the light beams issuing from said passageways, and means operable in response to the deenergization of said photo cells to selectively close one of the aforementioned normally open relays in circuit with the reversing motor.

4. In strip handling equipment wherein a strip of material is wound on a reeling device, a control system for maintaining the lineal speed of travel of said strip constant according to claim 3 in which the means responsive to the deenergization of the photo cells includes a circuit interrupter for causing the action of the said last named means as respects the closing of the normally open relays in circuit with the reversing motor to be intermittent.

GEORGE J. NICHOLS.

REFERENCES CITED

The following references are of record in the file of this patent:

UNITED STATES PATENTS

| Number | Name | Date |
|---|---|---|
| 2,147,421 | Bendz | Feb. 14, 1939 |
| 2,147,467 | Stephenson | Feb. 14, 1939 |
| 2,237,985 | German | Apr. 8, 1941 |
| 2,283,036 | Bohn | May 12, 1942 |
| 2,339,939 | Michel | Jan. 25, 1944 |
| 2,416,018 | Obszarny | Feb. 18, 1947 |
| 2,432,876 | Formhals | Dec. 16, 1947 |
| 2,447,654 | Kenyon | Aug. 24, 1948 |